Nov. 16, 1965 W. C. KOEMEL 3,217,813
ROTARY WEEDER
Filed Dec. 24, 1963 2 Sheets-Sheet 1
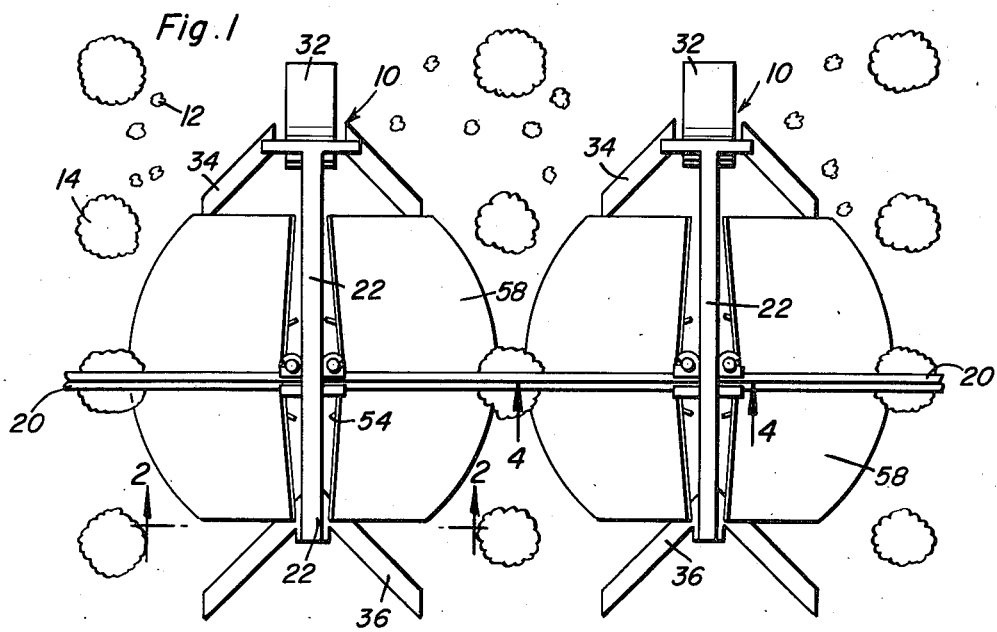
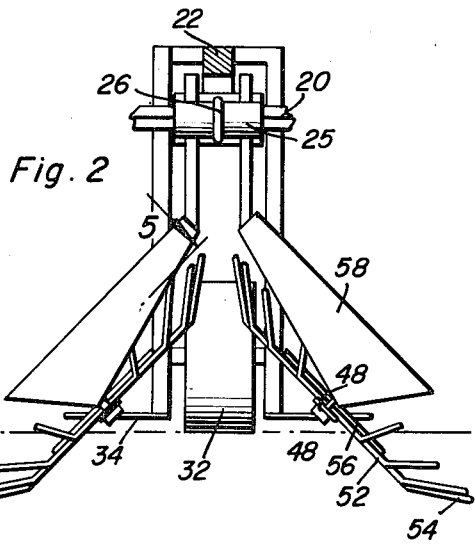
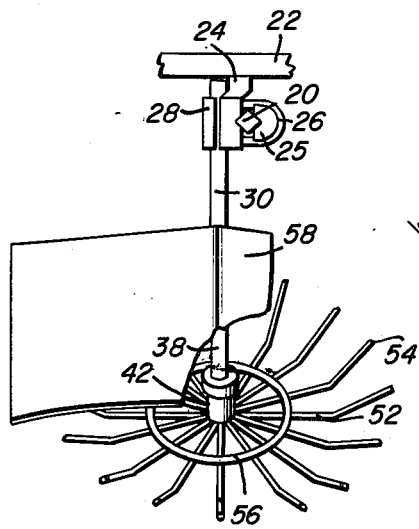
Walton Charles Koemel
INVENTOR.

Nov. 16, 1965     W. C. KOEMEL     3,217,813
ROTARY WEEDER
Filed Dec. 24, 1963     2 Sheets-Sheet 2
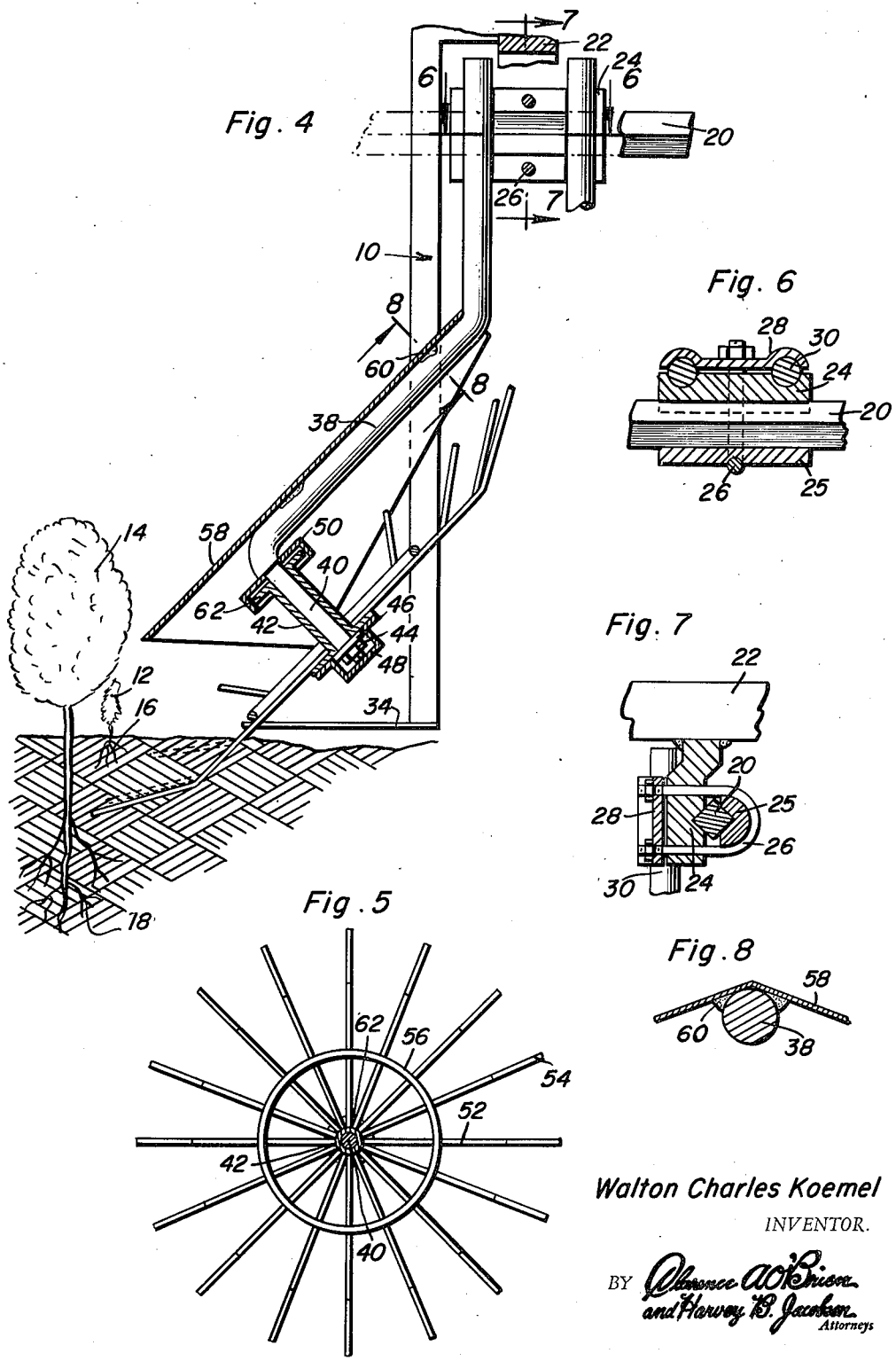
Walton Charles Koemel
INVENTOR.

United States Patent Office 3,217,813
Patented Nov. 16, 1965

3,217,813
ROTARY WEEDER
Walton Charles Koemel, Rte. 2, Lamesa, Tex.
Filed Dec. 24, 1963, Ser. No. 333,128
1 Claim. (Cl. 172—177)

The present invention generally relates to a rotary weeder for use in effectively killing weeds that are in the row with row crops or that have come up next to the crop.

An object of the present invention is to provide a rotary weeder that will kill all of the weeds in the crop row without damaging the crop in any way and the weeder of the present invention will also effectively eliminate the need for throwing dirt to the crop row in order to cover small weeds.

Another object of the present invention is to provide a rotary weeder that will effectively kill small weeds without introducing the hazard that flame or chemical weed killing methods have and the present invention is more efficient and less costly than flame or chemical cultivation.

Another object of the present invention is to provide a rotary weeder that will kill weeds of various heights with the rotary weeder operating at a depth that is below the root system of the weeds but at a depth less than the root system of the crop thereby effectively killing the weeds without any deleterious effect upon the crop.

Still another object of the present invention is to provide a rotary weeder which is simple in construction, easy to operate and relatively inexpensive to manufacture and maintain.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view of the rotary weeder of the present invention;

FIGURE 2 is a transverse, sectional view taken substantially upon a plane passing along section line 2—2 of FIGURE 1 illustrating the orientation of the components of the rotary weeder;

FIGURE 3 is a side elevational view of one of the rotary weeders with a portion of the shield broken away;

FIGURE 4 is a transverse, sectional view, on an enlarged scale, taken substantially upon a plane passing along section line 4—4 of FIGURE 1 illustrating further structural details of the rotary weeder and illustrating the relationship of the weeder to the weeds and the crop plant root systems;

FIGURE 5 is a detail sectional view taken substantially upon a plane passing along section line 5—5 of FIGURE 2 illustrating further structural details of the rotary weeder;

FIGURE 6 is a detail sectional view illustrating the structure of the mounting clamp therefor;

FIGURE 7 is a transverse, sectional view taken substantially upon a plane passing along section line 7—7 of FIGURE 4 illustrating further structural detail of the mounting flange; and FIGURE 8 is a detail sectional view taken substantially upon a plane passing along section line 8—8 of FIGURE 4 illustrating the manner in which the shield is mounded on the rotary weeder.

Referring now specifically to the drawings, the numeral 10 generally designates the rotary weeder of the present invention for killing weeds 12 in a row crop 14 in which the weeds 12 have a root system 16 above the root system 18 of the row crop 14 as illustrated in FIGURE 4. Each weeder 10 is mounted on a transverse tool bar 20 of conventional construction and the tool bar may be mounted on a towing tractor or any other suitable frame structure, the details of which are not disclosed since they are of no particular significance to the invention.

Each weeder includes a longitudinal frame member 22 having a depending mounting member 24 engaged with the tool bar 20. A clamp member 25 engages the opposite side of the tool bar and U-bolt clamps 26 secure the longitudinal frame member 22 to the tool bar 20. The U-shaped clamps 26 also secure a clamp plate 28 to the mounting bracket 24 and the clamp plate and the bracket 24 have corresponding recesses receiving a pair of vertically disposed rods 30 which are actually the vertical shanks of the weeder which is identical on opposite sides of the longitudinal frame member 22. The longitudinal frame member 22 has a depth wheel 32 on the forward end thereof and a pair of conventional sweeps 34 and 36 are provided for cultivating the center of the space between the crop rows 14.

The lower end of each depending shank 30 includes an outwardly inclined member 38 terminating in an inwardly inclined axle member 40 having a hub 42 journaled thereon. A retaining nut 44 is on the end of the axle 40 and a washer 46 engages the nut and the lower end of the hub and a cap 48 is attached to the hub for enclosing the nut 44. A hood or dust shield 50 is attached to the shaft 40 at the upper end of the hub or spindle 42 to keep dirt out of the bearing surface between the axle 40 and the hub or spindle 42 and this area may be provided with a suitable lubrication fitting for lubricating this bearing surface.

Attached rigidly to the spindle or hub 42 is a plurality of radial rods or teeth 52 having angulated inclined end portions or teeth 54 which are inclined outwardly as illustrated in FIGURE 4. A circular rod or angular member 56 is rigidly affixed to the arms 52 in concentric relation to the hub or spindle 42 thereby rigidifying the weeder.

A generaly arcuate shield of sheet metal construction or the like designated by numeral 58 is secured to the shank 38 as by welding 60 or the like and the shield extends forwardly and rearwardly and curves partially around the front and rear of the weeder as illustrated in FIGURES 1 and 4. The shields serve to lift up any row crop that would tend to lean over and possibly become entangled with the rotating teeth which are not driven but which are rotated due to their engagement with the soil. As illustrated, the teeth engage the soil and projects in an inclined direction down into the soil and then as they recede, the teeth elevate thus cultivating the soil and by setting the teeth 54 so that they underlie the root system 16 of weeds 12 and overlie the root system 18 of row crops 14, the weeds 12 will be completely destroyed without affecting the row crop in any way whatsoever.

The shanks 30 and 38 may be offset in any suitable manner for maximum crop clearance especially where large crops are encountered. The spindle 42 has annular wear rings 62 at the upper and lower ends thereof for increasing the life thereof and providing a surface for enabling lubrication to be effective for reducing the drag caused by rotation of the weeding elements. If desired, the teeth could be mounted half way between the ends of the spindle or bearing 42 and thus enabling them to be flipped over so that they would either point outwardly or point downwardly when they run in the soil. As illustrated, the device may be constructed of readily available materials thereby rendering the cost rather economical.

In operation, the rotary weeder rotates on the bearing formed by the spindle 42 and annular wear rings 62 rotating around axle shaft 40 and against hood 50 which also acts as an end thrust washer against the hub 42. As it rotates, the teeth 54 embed themselves and twist inwardly toward and then outwardly from the crop row 14. This action cuts weeds and stirs the soil at the same time. The weeder works best when the ends of the teeth are about two inches to three inches apart. The ends 54 of the teeth are bent in such a way as to obtain the largest weed cutting area at a uniform depth. Actually, the ends of the teeth 54 may be bent in either direction depending on the type and texture of the soil or they may be orientated either in an outward or downward direction by inverting the rotary wheels. When the teeth are bent down they cut into heavier soil without clogging up as easy. The axle can be set at different angles from the crop to get different soil stirring effects. In large branching and low fruiting crops, the shield 58 can be placed between the crop and rotary weeder to protect the crop from the moving parts of the rotary weeder.

For example, if the rotary weeder is shifted so that the shank 38 points in the direction of movement, the weeder will tend to pull soil toward the crop. However, if the shank portion 38 is angled away from the direction of movement of the cultivator, the weeder will tend to pull the soil away from the crop. Thus, the soil may be pulled toward the crop or pulled away from the crop or it may be just agitated in place. The penetration and soil stirring action of the present invention kills germinated seed as well as larger weeds where they are without moving any soil in any particular direction. The invention is so constructed that there is no need for the moving of soil from one place to another but the soil is simply agitated in situ. This is a great advantage where a certain soil level in relation to the crop must be maintained. Thus, the present invention has for one of its primary objects the positive soil stirring as a means for weed control without any necessity of moving soil in any direction with the gauge wheel being provided to orientate the rotary weeder in a proper elevational relationship to the surface of the soil being cultivated.

The present invention may be built into a cultivating unit or into the framework of an already existing conventional cultivator being mounted in the same way as conventional cultivator shanks are mounted. Also, the shanks of the sweeps in front of the cultivators are mounted directly in front of the shanks of the rotary weeders to provide the spindle on the rotary weeder more ground clearance inasmuch as the shank on the sweep is mounted at the deepest cut of the sweep. Thus, the association of the sweep at the front of the cultivator, the gauge wheel and the relationship of these components to the rotary weeders of the present invention all cooperate to produce an efficient weeding operation which is positive and accurate and effectively removes weeds of varying heights without any damage whatsoever to the row crops.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

A rotary weeder mounted on a transverse tool bar including a longitudinal frame member having a depending mounting bracket engaged with one side of the tool bar, a clamp member engaging the opposite side of the tool bar, U-shaped clamps securing a clamp plate to the mounting bracket, said clamp plate and mounting bracket having corresponding recesses receiving a vertically depending shank, a depth wheel and a pair of sweeps mounted on the forward end of the longitudinal frame member, the lower end of said depending shank including an outwardly inclined member terminating in an inwardly inclined axle member, a hub journaled to said axle member, a retaining nut on the end of the axle member, and a washer engaging the nut and the lower end of the hub for retaining the hub on the axle member, a cap attached to the hub enclosing the nut, a dust shield attached to the axle at the upper end of the hub to prevent dirt from entering the bearing surface between the axle and the hub, a plurality of radial teeth rigidly secured to the hub and having angulated outwardly inclined end portions, a circular rod rigidly affixed to the radial rods in concentric relation to the hub for rigidifying the weeder, a generally arcuate imperforate shield secured to the outwardly inclined member, said shield extending forwardly and rearwardly and curving partially around the front and rear of the weeder, said teeth being driven by engagement with the soil.

References Cited by the Examiner

UNITED STATES PATENTS

| | | | |
|---|---|---|---|
| 878,561 | 2/1908 | Ramsey | 172—517 X |
| 2,758,530 | 8/1930 | Gerbracht | 172—300 X |
| 2,108,351 | 2/1938 | Silver | 172—679 X |
| 2,633,790 | 4/1953 | Bauer et al. | 172—517 X |
| 2,976,939 | 3/1961 | Van der Lely et al. | 172—522 |
| 3,082,829 | 3/1963 | Buddingh et al. | 172—543 X |

FOREIGN PATENTS 835,654   5/1960   Great Britain.

ANTONIO F. GUIDA, *Acting Primary Examiner.*

T. GRAHAM CRAVER, *Examiner.*